US012809774B2

(12) United States Patent
Mujumdar et al.

(10) Patent No.: US 12,809,774 B2
(45) Date of Patent: Nov. 24, 2026

(54) MANAGING TABULAR DATA USING LARGE LANGUAGE MODELS

(71) Applicant: International Business Machines Corporation, Armonk, NY (US)

(72) Inventors: Shashank Mujumdar, Nagpur (IN); Shramona Chakraborty, Howrah (IN); Nitin Gupta, Saharanpur (IN); Prerna Agarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 19/000,806

(22) Filed: Dec. 24, 2024

(65) Prior Publication Data

US 2026/0178491 A1 Jun. 25, 2026

(51) Int. Cl.
*G06F 12/0802* (2016.01)
*G06F 40/295* (2020.01)

(52) U.S. Cl.
CPC ........ *G06F 12/0802* (2013.01); *G06F 40/295* (2020.01); *G06F 2212/60* (2013.01)

(58) Field of Classification Search
CPC . G06F 12/0802; G06F 40/295; G06F 2212/60
See application file for complete search history.

(56) References Cited

U.S. PATENT DOCUMENTS 8,195,712 B1 * 6/2012 McCormick .......... G06F 16/212 707/769
11,513,968 B1 * 11/2022 Sullivan ................ G06F 12/084
2009/0113309 A1 * 4/2009 Krauthgamer ........ G06F 16/283 715/739
2015/0006539 A1 * 1/2015 Sakamoto ............. G06F 16/907 707/740
2018/0173756 A1 * 6/2018 Lawton ............... G06F 16/9535
(Continued)

FOREIGN PATENT DOCUMENTS

CN 101196927 A 6/2008
EP 3985526 A1 4/2022

OTHER PUBLICATIONS

About Design Center, Retrieved from: https://docs.mulesoft.com/design-center/get-mapping-recommendations, 2025, 3 pages.
(Continued)

*Primary Examiner* — Ann J Lo
*Assistant Examiner* — Fernando M Mari Valcarcel
(74) *Attorney, Agent, or Firm* — Yee & Associates, P.C.

(57) ABSTRACT

A computer-implemented method for managing data is provided. A processor set receives a number of data pairs. The processor set annotates content of input data from the number of data pairs based on common entities associated with items in the content of input data from the number of data pairs using a large language model. The processor set identifies a set of common entities from the common entities associated with the content in input data from the number of data pairs using the large language model. The processor set generates a list of items for each common entity from the set of common entities using the large language model. The processor set stores the lists of items and output data in the number of data pairs in a program cache.

20 Claims, 7 Drawing Sheets

(56) References Cited

U.S. PATENT DOCUMENTS

| | | | | |
|---|---|---|---|---|
| 2023/0152994 | A1* | 5/2023 | Jiang | G06F 3/0679<br>711/154 |
| 2023/0169070 | A1 | 6/2023 | Ramalingam et al. | |
| 2023/0230228 | A1* | 7/2023 | Liu | G06N 3/0455 |
| 2024/0354830 | A1* | 10/2024 | Raghavan | G06Q 30/0631 |
| 2024/0403934 | A1* | 12/2024 | de Oliveira | G06Q 30/0629 |

OTHER PUBLICATIONS

Group Data Mapping, https://docs.workato.com/recipes/group-data-mapping.html#group-data-mapping, Mar. 25, 2024, 5 pages.

Ramirez, et al., Cache & Distil: Optimising API Calls to Large Language Models, arXiv:2310.13561v1 [cs.CL], Oct. 22, 2023, 14 pages.

Ramirez, et al., Optimising Calls to Large Language Models with UncertaintyBased Two-Tier Selection, arXiv:2405.02134v1 [cs.CL], May 3, 2024, 15 pages.

Singh, et al., Learning Semantic String Transformations from Examples, arXiv:1204.6079v1 [cs.DB], Apr. 26, 26, 2012, pp. 740-751.

SnapLogic TechTalk—Data Transformations and Mappings, Retrieved from: www.snaplogic.com/blog/_snaplogic-techtalk-data-transformations-and-mappings, 2025, 5 pages.

Stogiannidis, et al., Cache Me If You Can: An Online Cost-Aware Teacher-Student Framework to Reduce the Calls to Large Language Models, acarXiv:2310.13395v1 [cs.CL], Oct. 20, 2023, 10 pages.

* cited by examiner

MANAGING TABULAR DATA USING LARGE LANGUAGE MODELS

BACKGROUND

The disclosure relates generally to managing data and more specifically to managing tabular data using large language models.

A large language model is a type of deep learning model designed to understand and process human language. Large language models are trained on massive amounts of text data from diverse data sources to learn patterns, grammar, facts, and contextual relationships within language. Large language models have become pivotal in many applications because of their size and capacity of generalization. Large language models usually have billions of parameters or adjustable weights in a neural network to model language effectively. Large language models'deep architecture enables them to interpret context over long strings of text. In this case, the large language models can keep track of relationships and meanings across sentences and paragraphs even when dealing with complex passages.

One of the key strengths of large language models is their ability to understand context, semantics, and linguistic relationships within the text. This ability allows large language models to perform a wide range of tasks. For example, large language models can perform tasks such as translation by transforming text from one language to another. In this case, large language models are able to understand the deeper meaning, context, and cultural nuances of the source text to ensure that translated content conveys the same meaning as the original language.

SUMMARY

According to one illustrative embodiment, a computer-implemented method for managing data is provided. A processor set receives a number of data pairs. Each data pair in the number of data pairs comprises an input data and an output data that is semantically associated to the input data. The processor set annotates content of input data from the number of data pairs based on common entities associated with items in the content of input data from the number of data pairs using a large language model. The processor set identifies a set of common entities from the common entities associated with the content in input data from the number of data pairs using the large language model. The set of common entities are directly related to content of output data from the number of data pairs. The processor set generates a list of items for each common entity from the set of common entities using the large language model. The processor set stores the lists of items and output data in the number of data pairs in program cache. According to other illustrative embodiments, a computer system, and a computer program product for managing data are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
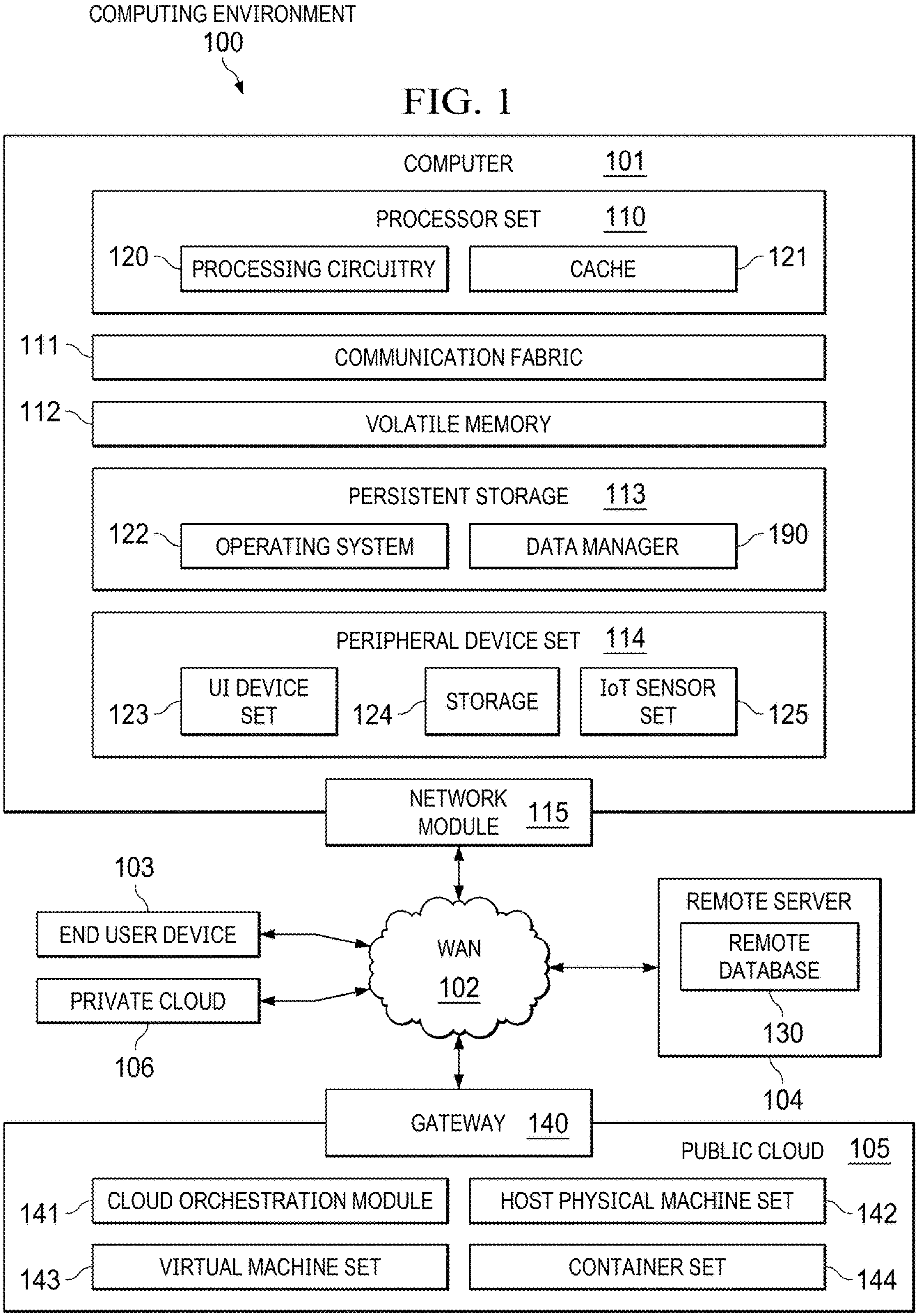
FIG. 1 is a pictorial representation of a computing environment in which illustrative embodiments may be implemented.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as data manager 190. In addition to data manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in data manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in data manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that large language models can be used for mapping different terminologies, ontologies, and schemas.

The illustrative embodiments also recognize and take into account that application on client side needs to call application programming interface (API) of large language model for each data point in order to get a semantic transformation output for a set of data points.

The illustrative embodiments also recognize and take into account that large language models incur high cost on the API calls for handling requests on a large scale, and thereby degrade application performance. The illustrative embodiments also recognize and take into account that it is questionable on the feasibility of using run-time features of large language models on tabular data. The illustrative embodiments also recognize and take into account that caching data as key-value pairs can play an important role to minimize API calls for large language models.

Thus, illustrative embodiments of the present invention provide a computer implemented method, computer system, and computer program product for managing data. A processor set receives a number of data pairs. Each data pair in the number of data pairs comprises an input data and an output data that is semantically associated to the input data. The processor set annotates content of input data from the number of data pairs based on common entities associated with items in the content of input data from the number of data pairs using a large language model. The processor set identifies a set of common entities from the common entities associated with the content in input data from the number of data pairs using the large language model. The set of common entities are directly related to content of output data from the number of data pairs. The processor set generates a list of items for each common entity from the set of common entities using the large language model. The processor set storing the lists of items and output data in the number of data pairs in program cache.

Figure 2:
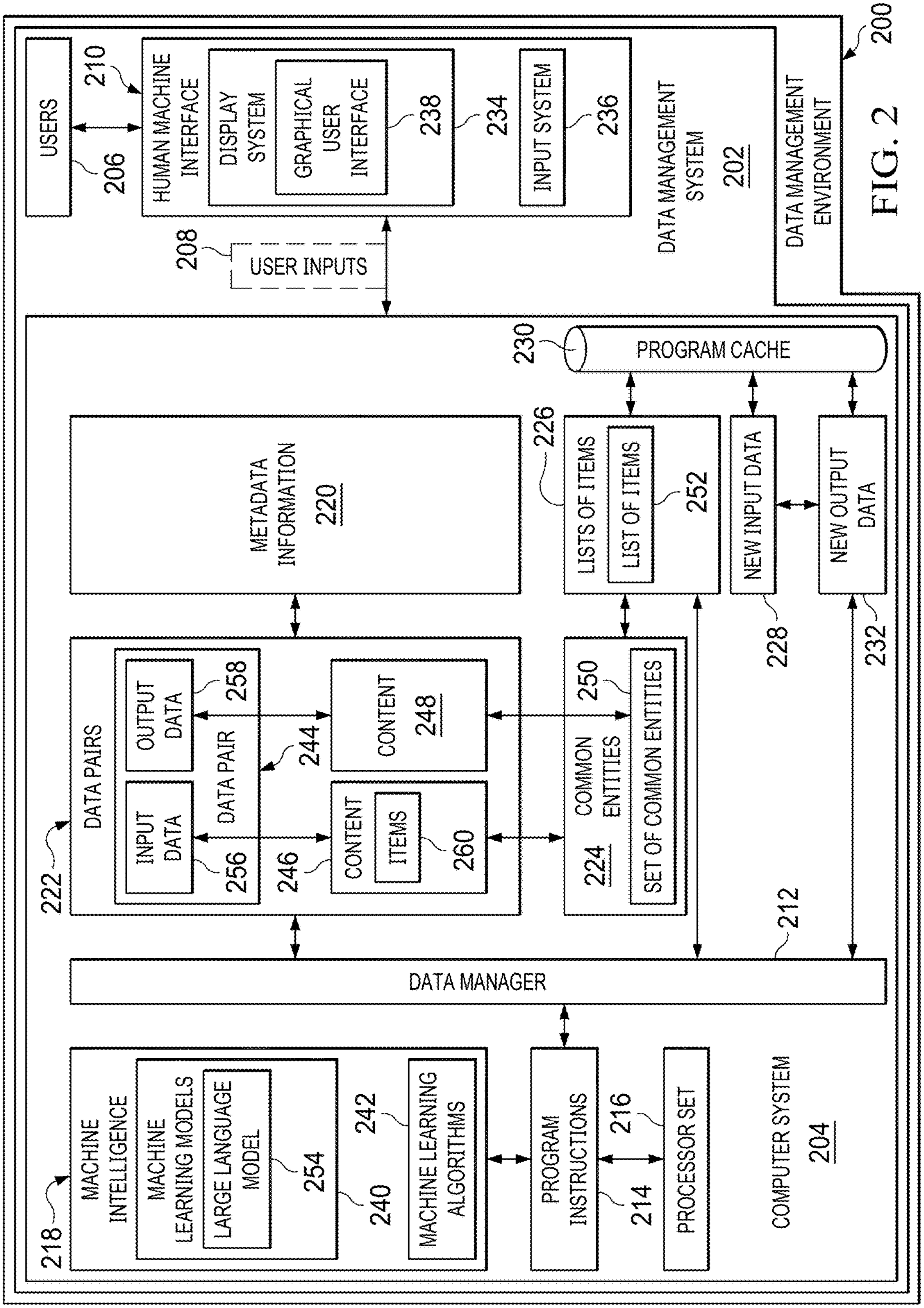
FIG. 2 is an illustration of a block diagram of a data management environment in accordance with an illustrative embodiment.

With reference now to FIG. 2, an illustration of a block diagram of a data management environment is depicted in accordance with an illustrative embodiment. In this illustrative example, data management environment 200 includes components that can be implemented in hardware such as the hardware shown in computing environment 100 in FIG. 1.

In this illustrative example, data management system 202 in data management environment 200 can be used to cache data as lists of items 226 that can be cached in program cache 230. In this illustrative example, data management system 202 includes computer system 204 which includes data manager 212. Data manager 212 is located in computer system 204. Data manager 212 may be implemented using data manager 190 in FIG. 1.

Data manager 212 can be implemented in software, hardware, firmware, or a combination thereof. When software is used, the operations performed by data manager 212 can be implemented in program instructions configured to run on hardware, such as a processor unit. When firmware is used, the operations performed by data manager 212 can be implemented in program instructions and data and stored in persistent memory to run on a processor unit. When hardware is employed, the hardware can include circuits that operate to perform the operations in data manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

As depicted, computer system 204 includes machine intelligence 218. Machine intelligence 218 can include machine learning models 240 and machine learning algorithms 242. Machine learning models 240 is a branch of artificial intelligence (AI) that enables computers to detect patterns and improve performance without direct programming commands. Rather than relying on direct input commands to complete a task, machine learning models 240 relies on input data. The data is fed into the machine, one of machine learning algorithms 242 is selected, parameters for the data are configured, and the machine is instructed to find patterns in the input data through optimization algorithms. The data model formed from analyzing the data is then used to predict future values.

Machine intelligence 218 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 218.

Machine intelligence 218 can be implemented using one or more systems such as an artificial intelligence system, a neural network, a generative neural network, a Bayesian network, an expert system, a fuzzy logic system, a genetic algorithm, or other suitable types of systems. Machine learning models 240 and machine learning algorithms 242 may make computer system 204 a special purpose computer for transforming input data into data that semantically associated to the input data.

Machine learning models 240 involves using machine learning algorithms 242 to build computation models based on samples of data. The samples of data used for training are referred to as training data or training datasets. Machine intelligence 218 can make predictions without being explicitly programmed to make these predictions. Machine intelligence 218 can be used for training and retraining computation models for a number of different types of applications. These applications include, for example, medicine, financial services, healthcare, speech recognition, computer vision, or other types of applications.

In this illustrative example, machine learning models 240 can include a number of models. For example, machine learning models 240 can include a deep learning model such as large language model 254. In this illustrative example, large language model 254 is a type of machine learning model designed to understand, generate, and manipulate human language. In FIG. 2, large language model 254 can be utilized by data manager 212 to perform a variety of tasks.

In this illustrative example, machine learning algorithms 242 can include supervised machine learning algorithms and unsupervised machine learning algorithms. Supervised machine learning can train machine learning models using data containing both the inputs and desired outputs. Examples of machine learning algorithms include XGBoost, K-means clustering, and random forest.

As depicted, data manager 212 can receive data pairs 222 from a data source or user inputs. In this illustrative example, each data pair in data pairs 222 includes an input data and an output data that is semantically associated to the input data. For example, data pair 244 in data pairs 222 includes input data 256 and output data 258 that is semantically associated to input data 256. In this illustrative example, semantically associated data refers to two expressions, statements, or representations that have contexts related to each other. In this illustrative example, data pairs 222 can be data in tabular format.

In this illustrative example, input data and output data in data pairs 222 can have an open set to closed set relationship or a close set to close set relationship. Open set to closed set relationship refers to the situation where input data is not fixed and can contain indefinite range of values while output data include fixed values and cannot be changed for representing the same context. For example, input data in data pairs 222 can be addresses and output data in data pairs 222 can be country codes. In this example, addresses can include large amounts of combined information that corresponds to the same area, city, state, or country. On the other hand, country codes are fixed values where each number represents one single country.

In a similar fashion, close set to close set relationship refers to the situation where both input data and output data include fixed values and cannot be changed for representing the same context. For example, input data in data pairs 222 can be states and output data in data pairs 222 can be countries. In this example, both states and countries have fixed values where each state and country can only represent a single geographical area.

For example, input data 256 can include an address of "298, Connaught Place, New Delhi, Delhi, India, 701162" and output data 258 can include country of "India" for the address. In this example, "country" in output data 258 provides contextual information for the address in input data 256, as the location of address is tied to a specific country.

As depicted, input data and output data in each data pair of data pairs 222 include contents that are contextually related to each other. For example, input data 256 can include content that is part of content 246 for all input data in data pairs 222. In a similar fashion, output data 258 can include content that is part of content 248 for all output data in data pairs 222. In this illustrative example, content 246 and content 248 can further include items that refer to individual pieces of information or specific elements that make up the overall dataset in content 246 and content 248. For example, input data 256 include an address of "298, Connaught Place, New Delhi, Delhi, India, 701162", items can be "298" for street number, "Connaught Place" for street name, "New Delhi" for city, "Delhi" for state, "India" for country, and "701162" for postal code. In this illustrative example, content 248 for output data in data pairs 222 can be a portion of content 246 for input data in data pairs 222.

In this illustrative example, data manager 212 can annotate content 246 for input data 256 using large language model 254. In this illustrative example, the annotation of content 246 can be based on common entities such as common entities 224 that are associated with items 260 in content 246 for input data 256. For example, if input data in data pairs 222 are addresses as listed above. Common entities 224 can include street number, street name, city, state, country, or postal code. In other words, common entities such as common entities 224 are categories of data for shared components or attributes that consistently appear across input data in input data 256.

In this illustrative example, the annotation of content 246 generates a table that includes items in items 260 that are classified under columns that represent each common entity. In other words, each column in the table generated by annotation of content 246 represents a common entity from common entities 224 and each column in the table includes a portion of items 260 that corresponds to the common entity represented by each column.

In this illustrative example, data manager 212 can use large language model 254 to identify a set of common entities 224 from common entities 224 that are directly related to content 248 for output data 258 in data pairs 222. For example, if common entities 224 includes "street names", "states", and "country", and content 248 incudes country code, the set of common entities 224 can include "states" and "country" because there can only be one country code for a state or a country. On the other hand, country code cannot be identified by "street names" alone since multiple countries or states can have streets with same street names. In other words, a common entity has a direct relation to content 248 when items in content 248 can be identified item included in the common entity alone.

In this illustrative example, data manager 212 uses large language model 254 to generate lists of items 226. A list of items is generated for each common entity from set of common entities 250. For example, list of items 252 can be generated for a common entity from set of common entities 250. In this illustrative example, large language model 254 identifies all possible items for each common entity from set of common entities 250. For example, if common entity for list of items 252 is "country", data manager 212 uses large language model 254 to identify all countries on earth and generates list of items 252 for all identified countries.

In this illustrative example, data manager 212 can modify lists of items based on metadata information 220 for data pairs 222. For example, metadata information 220 for data pairs 222 can specify that common entity "countries" included in items 260 are all Asian-pacific countries. In this illustrative example, data manager 212 can modify list of items for common entity "countries" in lists of items 226 by deleting all countries that are not Asian-pacific countries.

Data manager 212 can also select a list of items from lists of items to represent all lists in lists of items 226. In this illustrative example, the list of items can be selected in a number of ways. For example, data manager 212 can receive a user-defined criteria for ranking lists of items 226 and select the list of items based on ranking. In this example, the user-defined criteria can be the sizes for lists of items 226. In other words, data manager 212 can select the list of items from lists of items 226 that has the smallest size.

In this illustrative example, lists of items 226 or the selected item list of items from lists of items 226 can be combined with output data for data pairs 222 to generate an index to be stored in program cache 230. In this illustrative example, program cache 230 is the storage for computer system 204 that is used to store frequently accessed data or instructions to improve the efficiency and speed of program execution. Program cache 230 is designed to reduce the time it takes to access data from slower storage devices or memory sources, such as main memory or a remote server, by storing copies of frequently used data in a faster, more readily accessible location. In this illustrative example, lists of items 226 and output data for data pairs 222 can be saved as key-value pairs in the index.

In other words, data manager 212 does not need to make API calls for large language model 254 next time when returning an output for a new input data that is similar to input data in data pairs 222. For example, new output data 232 can be returned for new input data 228 by searching lists of items 226 stored in program cache 230. By such a method, the computer resources for making excessive amount of API calls for large language model 254 can be saved.

In this illustrative example, users 206 can interact with computer system 204 via user inputs 208. User inputs 208 can be generated by users 206 using human machine interface (HMI) 210. As depicted, human machine interface 210 includes display system 234 and input system 236. Display system 234 is a physical hardware system and includes one or more display devices on which graphical user interface 238 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, virtual reality headsets, or some other suitable device that can output information for the visual presentation of information.

In this example, users 206 are people that can interact with graphical user interface 238 through user inputs 208 generated by input system 236. For example, user inputs 208 can include new input data 228 received from users 206. Input system 236 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device. For example, users 206 can view common entities 224, set of common entities 250, lists of items 226, new input data 228, and new output data 232 through graphical user interface 238.

In one illustrative example, one or more solutions are present that overcome a problem with excessive API calls for transforming data using large language models. As a result, one or more technical solutions may provide an ability to increase the efficiency for transforming data for computer system 204.

In the illustrative example, computer system 204 can be configured to perform at least one of the steps, operations, or actions described in the different illustrative examples using software, hardware, firmware, or a combination thereof. As a result, computer system 204 operates as a special purpose computer system in which data manager 212 in computer system 204 enables efficiently returning output data that are saved in program cache 230. In particular, data manager 212 transforms computer system 204 into a special purpose computer system as compared to currently available general computer systems that do not have a data manager 212.

The illustration of data management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
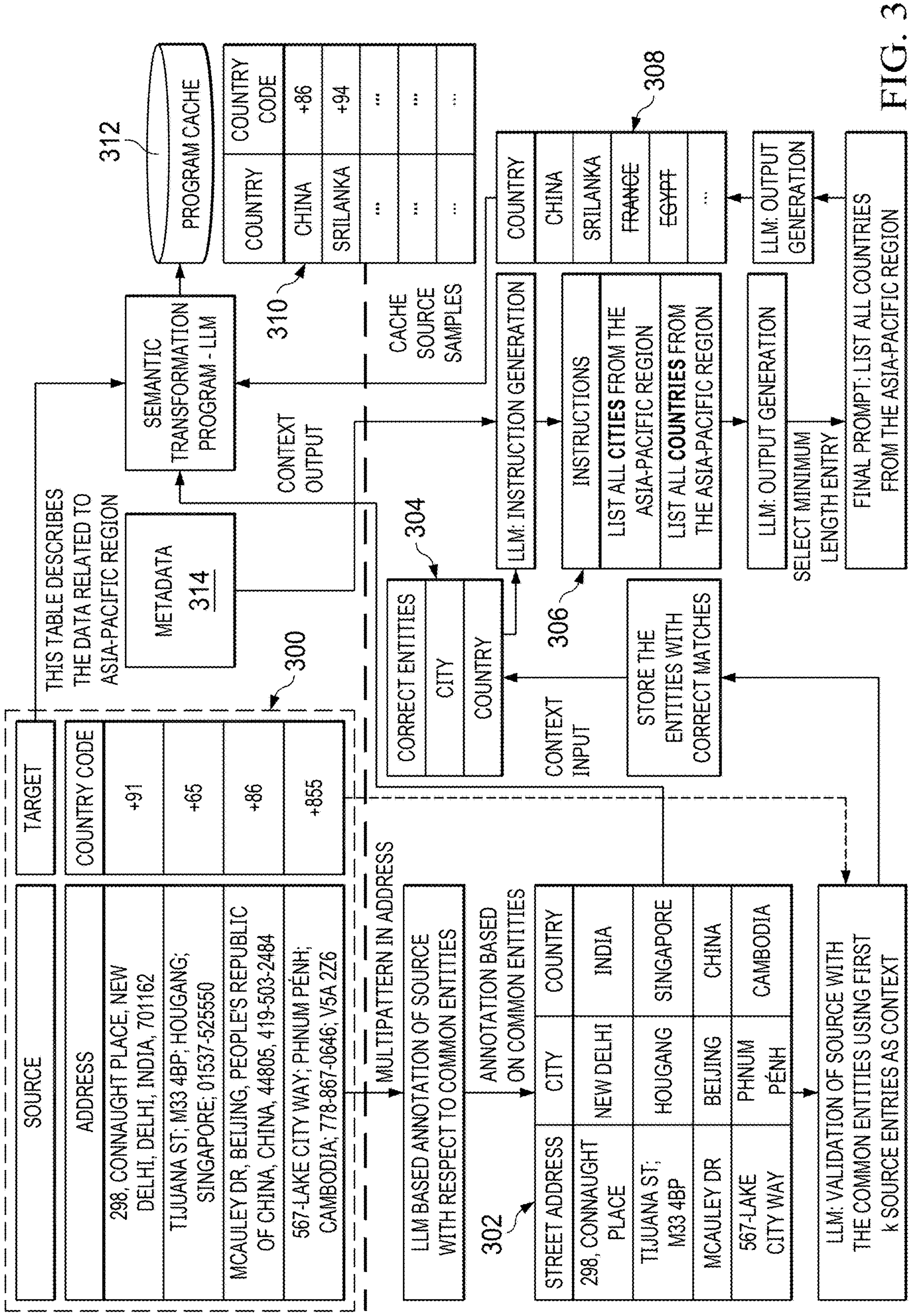
FIG. 3 is an illustration of a process flow for caching output data in program cache in accordance with an illustrative embodiment.

With reference now to FIG. 3, an illustration of a process flow for caching output data in program cache for data transformations is shown in accordance with an illustrative embodiment. The process flow in FIG. 3 can be implemented in hardware, software, or both. When implemented in software, the process flow can take the form of program instructions that are run by one of more processor units located in one or more hardware devices in one or more computer systems. For example, the process can be implemented in data manager 212 in computer system 204 in FIG. 2.

In FIG. 3, table 300 includes data pairs with input data and output data that is semantically associated to the input data. In this illustrative example, data pairs in table 300 can be examples of data pairs 222 in FIG. 2. Table 300 contains input data that includes a number of addresses and output data that includes a country code for the number of addresses included in input data. In FIG. 3, input data is shown as "source" and output data is shown as "target".

In this illustrative example, it is difficult for a machine to return a country code for a given address because the country code is not part of the given address even though they are semantically associated. In addition, large language models need to process addresses in table 300 entry by entry and thereby making excessive amount of API calls between the large language models and client devices.

In this illustrative example, large language models can perform annotations to table 300 to extract common entities for input data in table 300. As depicted, table 302 is generated by annotating table 300. In table 302, items in input data from table 300 are divided into different columns that represent different common entities. In this illustrative example, common entities extracted for input data from table 300 includes "street address", "city", and "country".

In this illustrative example, table 302 can be validated by cross referencing first k entries of table 300 and table 302, where "k" can be any number defined by a user. In this illustrative example, common entities that can be used for determining country codes are identified. For example, list 304 that includes "city" and "country" are generated based on the identification. In other words, list 304 includes common entities for input data of table 300 that can be used for determining output data of table 300.

In FIG. 3, prompt instructions are generated in order to have the large language models to identify all possible items for common entities included in list 304. For example, instructions 306 that includes "list all cities from the Asia-pacific region" and "list all countries from the Asia-pacific region". In this illustrative example, instructions 306 can be generated based on metadata 314. Metadata 314 is additional information that is associated with table 300. In FIG. 3, metadata 314 specifies that all addresses in table 300 come from Asia-pacific regions.

In this illustrative example, lists of items for common entities "cities" and "countries" are generated by the large language models based on instructions 306. In this case, the large language models can select a single list of items from the lists of items for further processing. For example, list of items 308 for common entity "country" is selected to save computer resources because it has a smaller size compared to list of items for common entity "city". In this illustrative example, list of items 308 can be examples of lists of items 226 in FIG. 2.

It should be understood that the filtering of items in lists of items such as list of items 308 can be performed after list of items are generated. For example, the large language models can first generate prompt instructions for generating the lists of items by identifying all cities and all countries in the world and then deleting cities and countries that are not within Asia-pacific region in those lists of items.

In this illustrative example, list of items 308 is combined with output data from table 300 to generate index 310. In FIG. 3, index 310 can be saved in program cache 312 for fast retrieval. In this illustrative example, program cache 312 can be an example of program cache 230 in FIG. 2.

Figure 4:
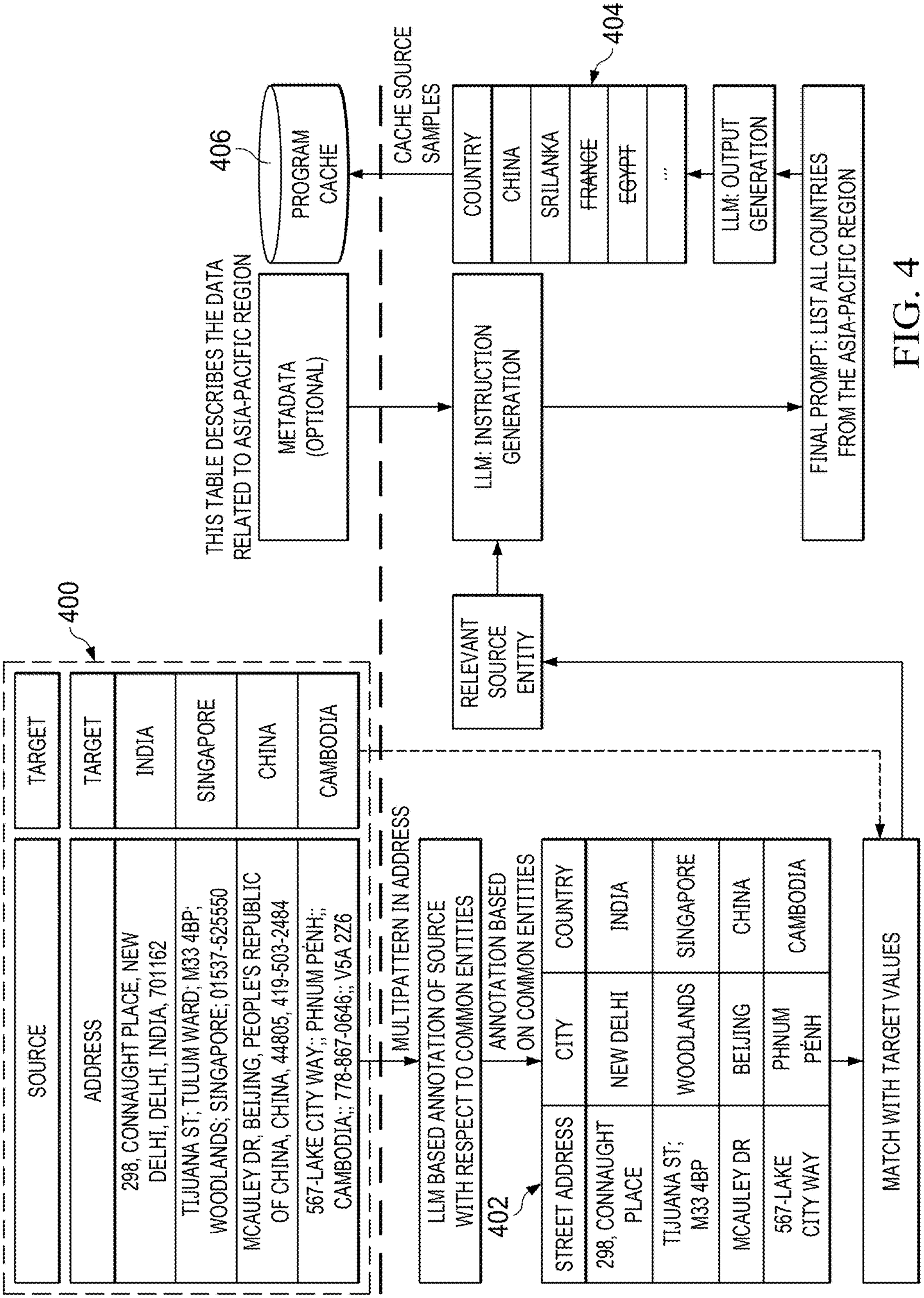
FIG. 4 is an illustration of a process flow for caching output data in program cache in accordance with an illustrative embodiment.

With reference now to FIG. 4, an illustration of a process flow for caching output data in program cache for data transformations is shown in accordance with an illustrative embodiment. The process flow in FIG. 4 can be implemented in hardware, software, or both. When implemented in software, the process flow can take the form of program instructions that are run by one of more processor units located in one or more hardware devices in one or more computer systems. For example, the process can be implemented in data manager 212 in computer system 204 in FIG. 2.

In FIG. 4, table 400 includes data pairs with input data and output data that is semantically associated to the input data. In this illustrative example, data pairs in table 300 can be examples of data pairs 222 in FIG. 2. Table 400 contains input data that includes a number of addresses and output data that includes countries for the number of addresses included in input data. In FIG. 4, input data is shown as "source" and output data is shown as "target".

In this illustrative example, it is easy for a machine to return a country for a given address because the country is part of the given address. In a similar fashion, table 402 is generated by annotating table 400 using large language models.

As depicted, table 402 is generated by annotating table 400. In table 402, items in input data from table 400 are divided into different columns that represent different common entities. In this illustrative example, common entities extracted for input data from table 400 includes "street address", "city", and "country".

In this illustrative example, common entities that can be used for determining country codes can be easily identified because output data in table 400 is included in input data in table 400. Therefore, list of items 404 can be directly generated by the large language models by identifying all countries for common entity "country", which is the common entity for output data in table 400. In this illustrative example, items in list of items 404 can be further filtered to exclude non Asia pacific countries based on metadata. In a similar fashion, list of items 404 can directly be saved in program cache 406 for fast retrieval.

The illustration of process flow in FIG. 3-4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. The method described above can also be used to transform other types of semantically associated data that are not associated with date.

Figure 5:
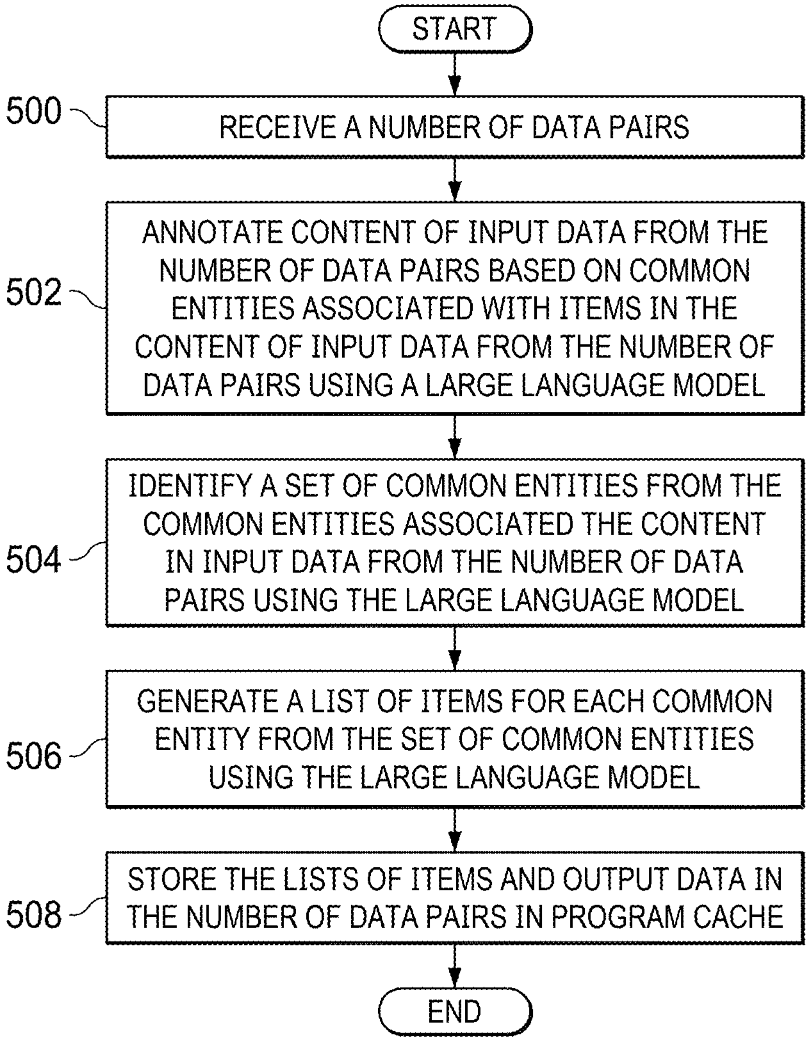
FIG. 5 is a flowchart of a process for managing data in accordance with an illustrative embodiment.

With reference now to FIG. 5, a flowchart illustrating a process for managing data is shown in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in data manager 212 in computer system 204 in FIG. 2.

The process begins by receiving a number of data pairs (step 500). In this step, each data pair in the number of data pairs comprises an input data and an output data that is semantically associated to the input data. The process annotates content of input data from the number of data pairs based on common entities associated with items in the content of input data from the number of data pairs using a large language model (step 502).

The process identifies a set of common entities from the common entities associated with the content in input data from the number of data pairs using the large language model (step 504). In step 504, the set of common entities are directly related to content of output data from the number of data pairs. The process generates a list of items for each common entity from the set of common entities using the large language model (step 506).

The process stores the lists of items and output data in the number of data pairs in program cache (step 508). The process terminates thereafter.

Figure 6:
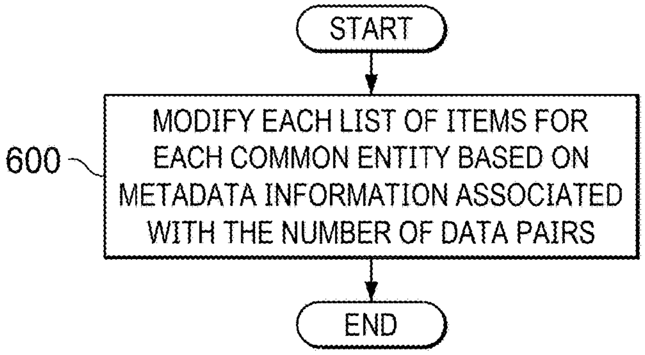
FIG. 6 is a flowchart of a process for modifying lists in accordance with an illustrative embodiment.

Turning next to FIG. 6, a flowchart of a process for modifying lists is depicted in accordance with an illustrative embodiment. The process in this figure is an example of an additional step that can be performed with the steps in FIG. 5.

The process begins by modifying each list of items for each common entity based on metadata information associated with the number of data pairs (step 600). The process terminates thereafter.

Figure 7:
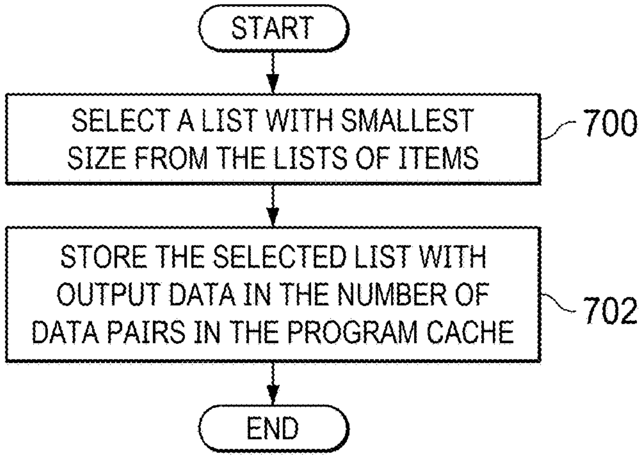
FIG. 7 is a flowchart of a process for storing lists of items in accordance with an illustrative embodiment.

Turning next to FIG. 7, a flowchart of a process for storing lists of items is depicted in accordance with an illustrative embodiment. The process in this flowchart is an example of an implementation for step 508 in FIG. 5.

The process begins by selecting a list with smallest size from the lists of items (step 700). The process stores the selected list with output data in the number of data pairs in the program cache (step 702). The process terminates thereafter.

Figure 8:
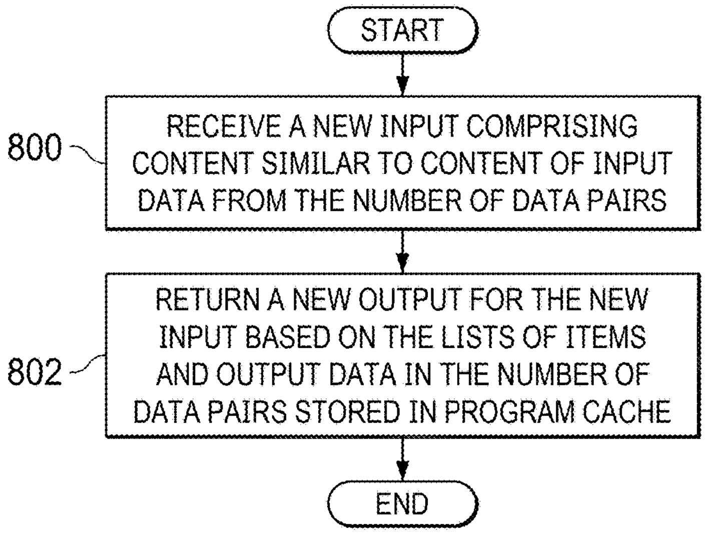
FIG. 8 is a flowchart of a process for returning new output in accordance with an illustrative embodiment.

Turning next to FIG. 8, a flowchart of a process for returning new output is depicted in accordance with an illustrative embodiment. The process in this figure is an example of an additional step that can be performed with the steps in FIG. 5.

The process begins by receiving a new input comprising content similar to content of input data from the number of data pairs (step 800). The process returns a new output for the new input based on the lists of items and output data in the number of data pairs stored in program cache (step 802). The process terminates thereafter.

Figure 9:
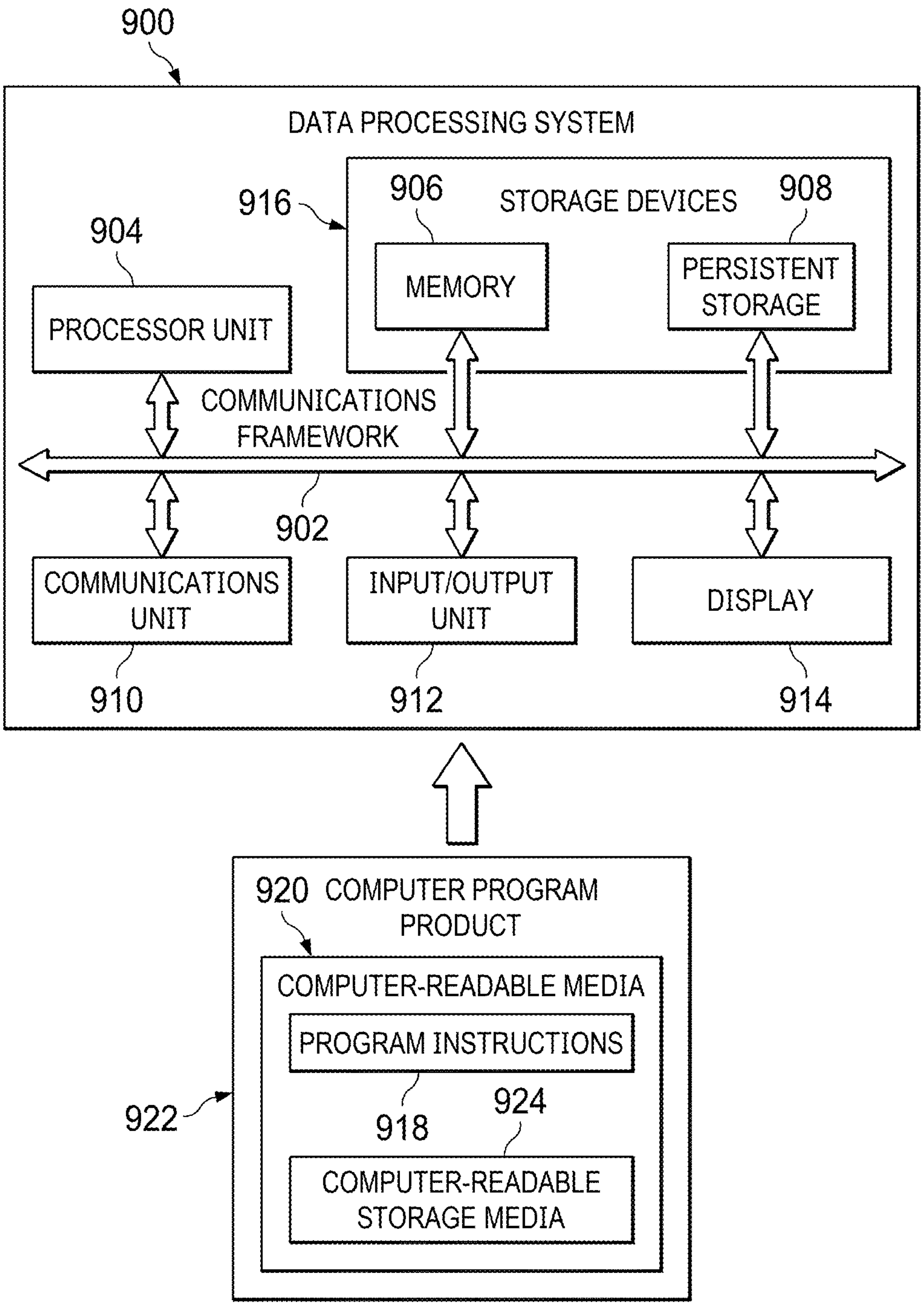
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement computers and computing devices in computing environment 100 in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can be implemented using one or more heterogeneous processor systems in which a main processor is present with secondary processors on a single chip. As another illustrative example, processor unit 904 can be a symmetric multiprocessor system containing multiple processors of the same type on a single chip.

Memory 906 and persistent storage 908 are examples of storage devices 916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program instructions, computer usable program instructions, or computer-readable program instructions that can be read and executed by a processor in processor unit 904. The program instructions in the different embodiments can be embodied on different physical or computer-readable storage media, such as memory 906 or persistent storage 908.

Program instructions 918 are located in a functional form on computer-readable media 920 that is selectively removable and can be loaded onto or transferred to data processing system 900 for execution by processor unit 904. Program instructions 918 and computer-readable media 920 form computer program product 922 in these illustrative examples. In the illustrative example, computer-readable media 920 is computer-readable storage media 924.

Computer-readable storage media 924 is a physical or tangible storage device used to store program instructions 918 rather than a medium that propagates or transmits program instructions 918. Computer-readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 918 can be transferred to data processing system 900 using a computer-readable signal media. The computer-readable signal media are signals and can be, for example, a propagated data signal containing program instructions 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program instructions 918 can be located in computer-readable media 920 in the form of a single storage device or system. In another example, program instructions 918 can be located in computer-readable media 920 that is distributed in multiple data processing systems. In other words, some instructions in program instructions 918 can be located in one data processing system while other instructions in program instructions 918 can be located in one data processing system. For example, a portion of program instructions 918 can be located in computer-readable media 920 in a server computer while another portion of program instructions 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program instructions 918.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing data, the computer implemented method comprising:

training, by a processor set, a large language model with a training dataset, wherein the large language model is trained to understand, generate, and manipulate human language for natural language processing tasks;

receiving, by a processor set, a number of data pairs, wherein each data pair in the number of data pairs comprises an input data and an output data that is semantically associated to the input data, and wherein the input data and the output data in each data pair have at least one of an open set to closed set relationship and an close set to close set relationship;

annotating, by the processor set using a large language model, content of input data from the number of data pairs based on common entities associated with items in content of input data from the number of data pairs, wherein the annotation generates a table comprising items in the items that are classified under columns that represent each common entity;

identifying, by the processor set using the large language model, a set of common entities from the common entities associated with the content in input data from the number of data pairs, wherein the set of common entities are directly related to content of output data from the number of data pairs;

generating, by the processor set using the large language model, a list of items for each common entity from the set of common entities, wherein the generation of the list of items for each common entity is performed by making application programming interface (API) calls to the large language model;

combining, by the processor set, the lists of items and output data in the number of data pairs to generate an index for storing in program cache;

receiving, by the processor set, a new input comprising content similar to content of input data from the number of data pairs; and returning, by the processor set, a new output for the new input by searching the index stored in program cache without making additional application programming interface (API) calls to the large language model.

2. The computer implemented method of claim 1, further comprising:

modifying, by the processor set, each list of items for each common entity based on metadata information associated with the number of data pairs.

3. The computer implemented method of claim 2, wherein modification of each list of items comprises filtering each list of items by deleting items that are inconsistent with the metadata information associated with the number of data pairs.

4. The computer implemented method of claim 1, wherein storing, by the processor set, the lists of items and output data in the number of data pairs in program cache as key-value pairs comprises:

selecting, by the processor set, a list with smallest size from the lists of items; and storing, by the processor set, the selected list with output data in the number of data pairs in the program cache.

5. The computer implemented method of claim 1, wherein output data matches a portion of content in input data in each data pair from the number of data pairs.

6. The computer implemented method of claim 1, wherein input data and output data in the number of data pairs has closed set to closed set relationship.

7. The computer implemented method of claim 1, wherein the lists of items and output data in the number of data pairs are stored in the program cache as key-value pairs.

8. A computer system for transforming data, comprising:

a processor set;

a set of one or more computer-readable storage media; and program instructions stored on the set of one or more storage media to cause the processor set to perform operations comprising:

training a large language model with a training dataset, wherein the large language model is trained to understand, generate, and manipulate human language for natural language processing tasks;

receiving a number of data pairs, wherein each data pair in the number of data pairs comprises an input data and an output data that is semantically associated to the input data, and wherein the input data and the output data in each data pair have at least one of an open set to closed set relationship and an close set to close set relationship;

annotating content of input data from the number of data pairs based on common entities associated with items in the content of input data from the number of data pairs using a large language model, wherein the annotation generates a table comprising items in the items that are classified under columns that represent each common entity;

identifying a set of common entities from the common entities associated with the content in input data from the number of data pairs using the large language model, wherein the set of common entities are directly related to content of output data from the number of data pairs;

generating a list of items for each common entity from the set of common entities using the large language model, wherein the generation of the list of items for each common entity is performed by making application programming interface (API) calls to the large language model;

combining the lists of items and output data in the number of data pairs in program cache;

receiving a new input comprising content similar to content of input data from the number of data pairs; and returning a new output for the new input by searching the index stored in program cache without making additional application programming interface (API) call to the large language model.

9. The computer system of claim 8, wherein the operations further comprise:

modifying each list of items for each common entity based on metadata information associated with the number of data pairs.

10. The computer system of claim 9, wherein modification of each list of items comprises filtering each list of items by deleting items that are inconsistent with the metadata information associated with the number of data pairs.

11. The computer system of claim 8, wherein the storing the lists of items and output data in the number of data pairs in program cache as key-value pairs comprises:

selecting a list with smallest size from the lists of items; and storing the selected list with output data in the number of data pairs in the program cache.

12. The computer system of claim 8, wherein output data matches a portion of content in input data in each data pair from the number of data pairs.

13. The computer system of claim 8, wherein input data and output data in the number of data pairs has closed set to closed set relationship.

14. The computer system of claim 8, wherein the lists of items and output data in the number of data pairs are stored in the program cache as key-value pairs.

15. A computer program product for managing data, comprising:

a set of one or more computer-readable storage media;

program instructions stored in the set of one or more computer-readable storage media to perform operations comprising:

training, by a processor set, a large language model with a training dataset, wherein the large language model is trained to understand, generate, and manipulate human language for natural language processing tasks;

receiving, by a processor set, a number of data pairs, wherein each data pair in the number of data pairs comprises an input data and an output data that is semantically associated to the input data, and wherein the input data and the output data in each data pair have at least one of an open set to closed set relationship and an close set to close set relationship;

annotating, by the processor set using a large language model, content of input data from the number of data pairs based on common entities associated with items in content of input data from the number of data pairs, wherein the annotation generates a table comprising items in the items that are classified under columns that represent each common entity;

identifying, by the processor set using the large language model, a set of common entities from the common entities associated with the content in input data from the number of data pairs, wherein the set of common entities are directly related to content of output data from the number of data pairs;

generating, by the processor set using the large language model, a list of items for each common entity from the set of common entities, wherein the generation of the list of items for each common entity is performed by making application programming interface (API) calls to the large language model;

combining, by the processor set, the lists of items and output data in the number of data pairs to generate an index for storing in program cache;

receiving, by the processor set, a new input comprising content similar to content of input data from the number of data pairs; and returning, by the processor set, a new output for the new input by searching the index stored in program cache without making additional application programming interface (API) calls to the large language model.

16. The computer program product of claim 15, wherein the operations further comprise:

modifying, by the processor set, each list of items for each common entity based on metadata information associated with the number of data pairs.

17. The computer program product of claim 16, wherein modification of each list of items comprises filtering each list of items by deleting items that are inconsistent with the metadata information associated with the number of data pairs.

18. The computer program product of claim 15, wherein the storing, by the processor set, the lists of items and output data in the number of data pairs in program cache as key-value pairs comprises:

selecting, by the processor set, a list with smallest size from the lists of items; and storing, by the processor set, the selected list with output data in the number of data pairs in the program cache.

19. The computer program product of claim 15, wherein output data matches a portion of content in input data in each data pair from the number of data pairs.

20. The computer program product of claim 15, wherein the lists of items and output data in the number of data pairs are stored in the program cache as key-value pairs.

* * * * *